United States Patent
Takasaki et al.

(10) Patent No.: US 7,997,368 B2
(45) Date of Patent: Aug. 16, 2011

(54) BATTERY CASE FOR ELECTRIC VEHICLE

(75) Inventors: Seiichi Takasaki, Okazaki (JP); Takeshi Ibuki, Anjo (JP); Haruchika Nishino, Okazaki (JP)

(73) Assignees: Mitsubishi Jidosha Kogyo Kabushiki Kaisha, Tokyo (JP); Mitsubishi Jidosha Engineering Kabushiki Kaisha, Aichi (JP)

(*) Notice: Subject to any disclaimer, the term of this patent is extended or adjusted under 35 U.S.C. 154(b) by 204 days.

(21) Appl. No.: 12/410,165

(22) Filed: Mar. 24, 2009

(65) Prior Publication Data

US 2009/0236162 A1   Sep. 24, 2009

Related U.S. Application Data

(63) Continuation of application No. PCT/JP2008/053996, filed on Mar. 5, 2008.

(30) Foreign Application Priority Data

Sep. 28, 2007   (JP) ................. 2007-254263

(51) Int. Cl.
*B60R 16/04*   (2006.01)
*H01M 2/10*   (2006.01)
(52) U.S. Cl. ................ 180/68.5; 429/100
(58) Field of Classification Search ......... 180/68.5, 180/65.1, 65.21; 429/96, 97, 98, 99, 100
See application file for complete search history.

(56) References Cited

U.S. PATENT DOCUMENTS

| 4,365,681 | A | * | 12/1982 | Singh | 180/68.5 |
|---|---|---|---|---|---|
| 5,390,754 | A | * | 2/1995 | Masuyama et al. | 180/68.5 |
| 5,460,234 | A | * | 10/1995 | Matsuura et al. | 180/65.1 |
| 5,501,289 | A | * | 3/1996 | Nishikawa et al. | 180/68.5 |
| 5,639,571 | A | * | 6/1997 | Waters et al. | 429/71 |
| 6,188,574 | B1 | * | 2/2001 | Anazawa | 361/695 |
| 6,632,560 | B1 | * | 10/2003 | Zhou et al. | 429/99 |
| 2005/0173170 | A1 | * | 8/2005 | Miyajima et al. | 180/68.5 |
| 2006/0016633 | A1 | * | 1/2006 | Fujii et al. | 180/68.5 |
| 2007/0017720 | A1 | * | 1/2007 | Fujii et al. | 180/68.5 |

FOREIGN PATENT DOCUMENTS

| JP | 62-167616 U | 10/1987 |
|---|---|---|
| JP | 8-186390 A | 7/1996 |
| JP | 8-281660 A | 10/1996 |

* cited by examiner

*Primary Examiner* — Hau V Phan
*Assistant Examiner* — Bridget Avery
(74) *Attorney, Agent, or Firm* — Birch, Stewart, Kolasch & Birch, LLP

(57) ABSTRACT

A battery case for containing therein battery modules includes a tray member, cover member, and seal member. The seal member is applied to a joint part between the tray member and cover member. Insert members made of metal are embedded in the resin of the tray member. Each of the insert members is provided with an embedded bolt a threaded part of which protrudes upward, and embedded nuts. The battery case is provided with first fastening sections and second fastening sections. In the first fastening section, a nut member is screwed onto the embedded bolt from above the cover member. In the second fastening section, a bolt member is screwed into the embedded nut from above the cover members.

8 Claims, 12 Drawing Sheets

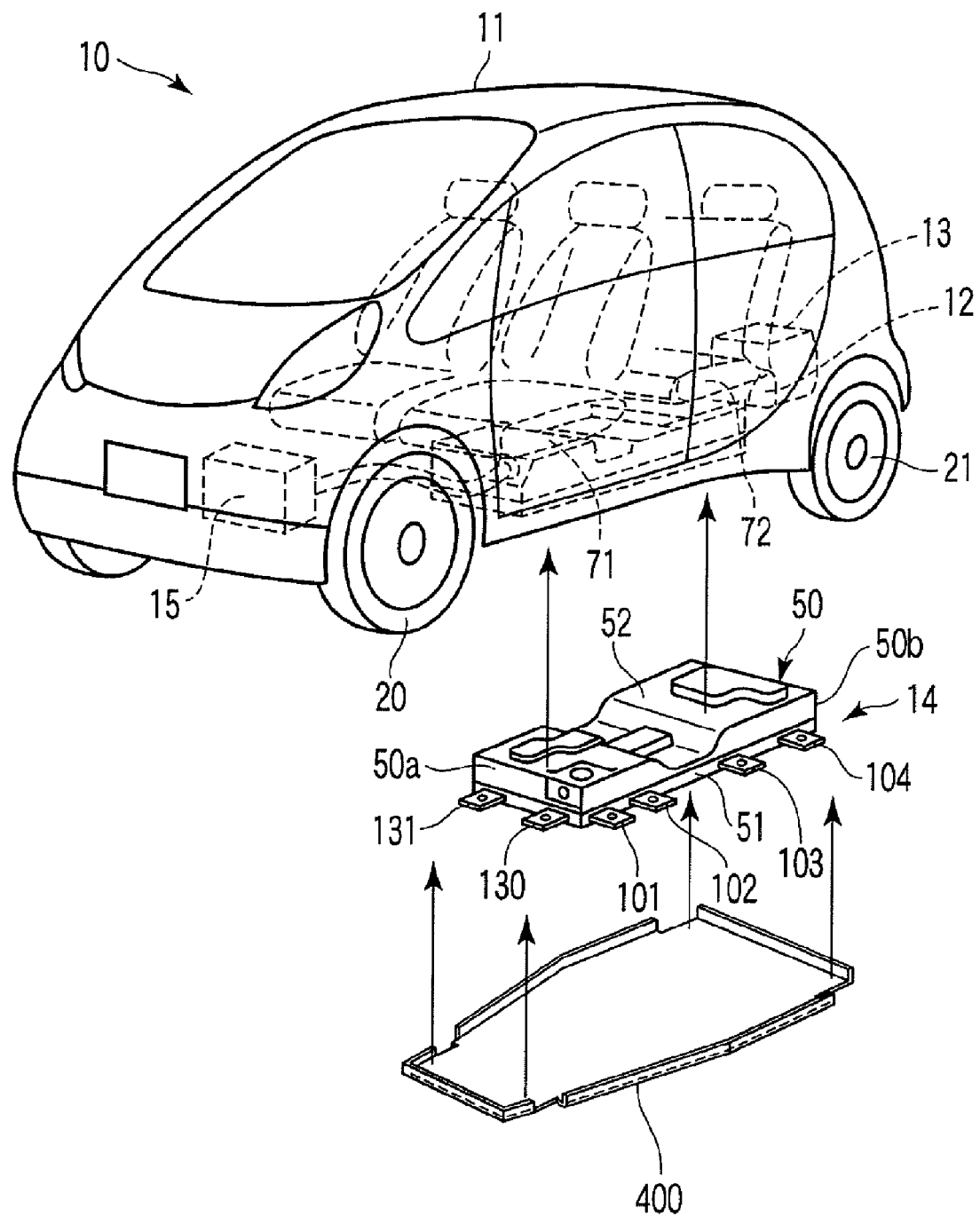
F I G. 1

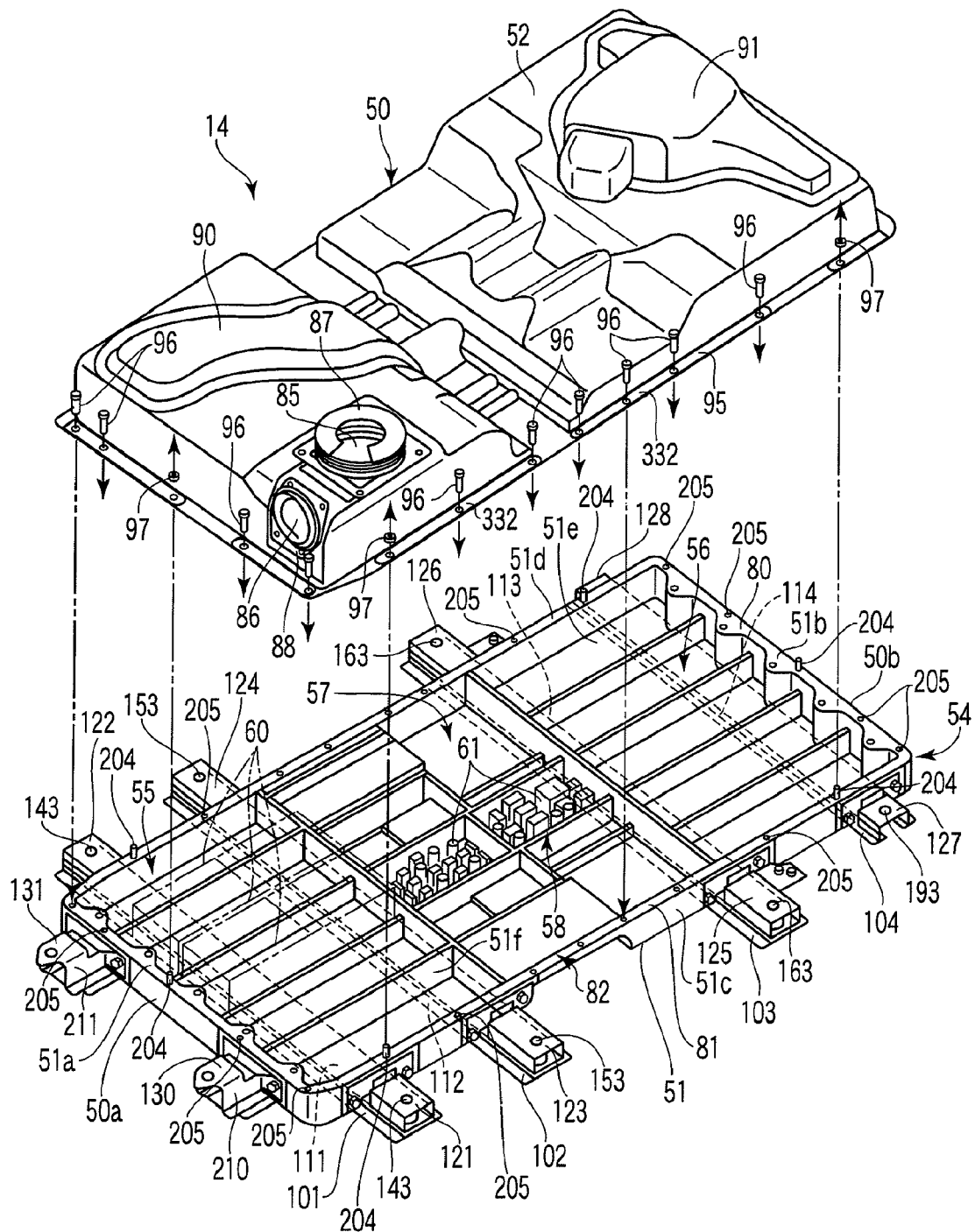
F I G. 3

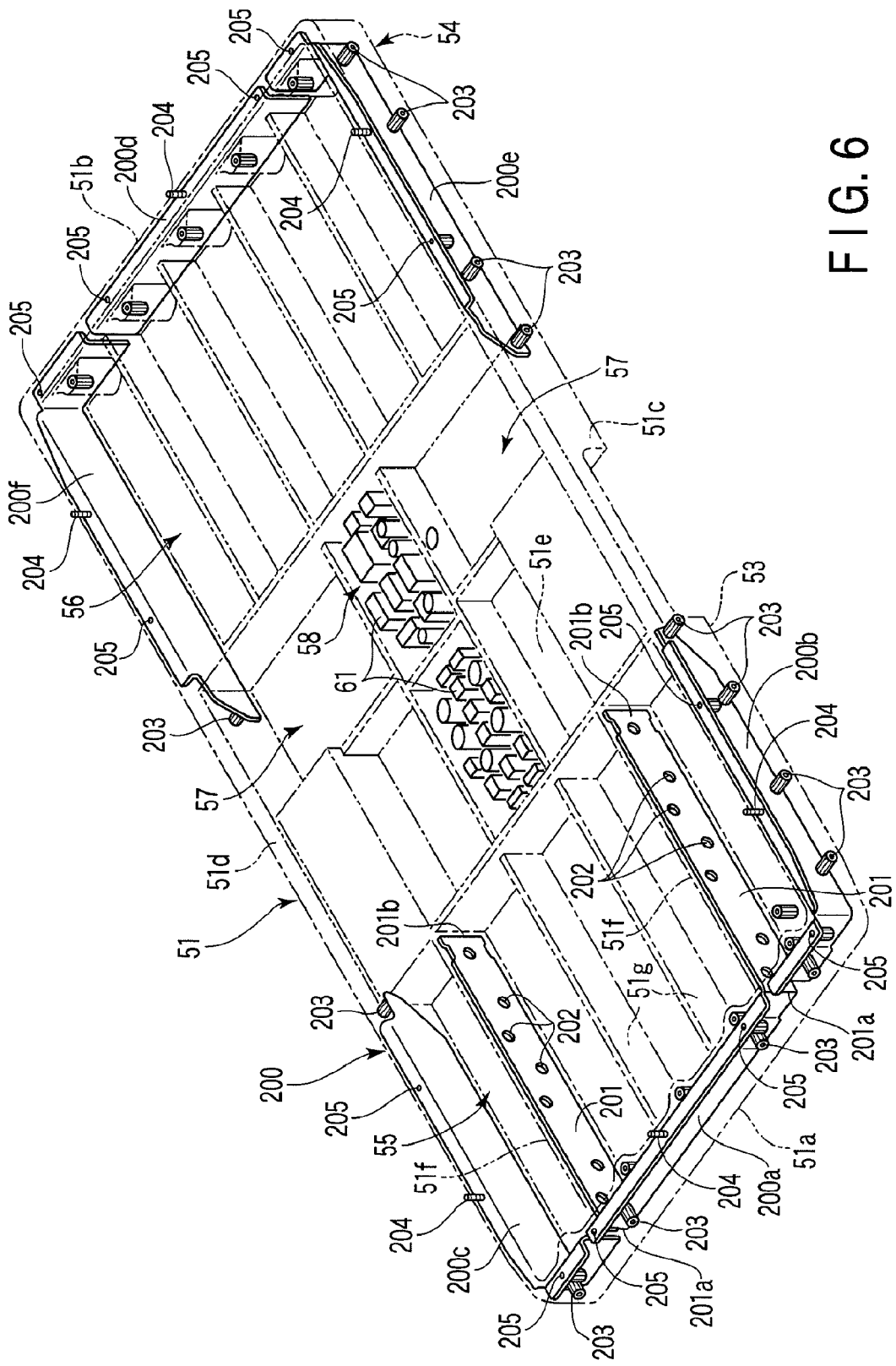
F I G. 6

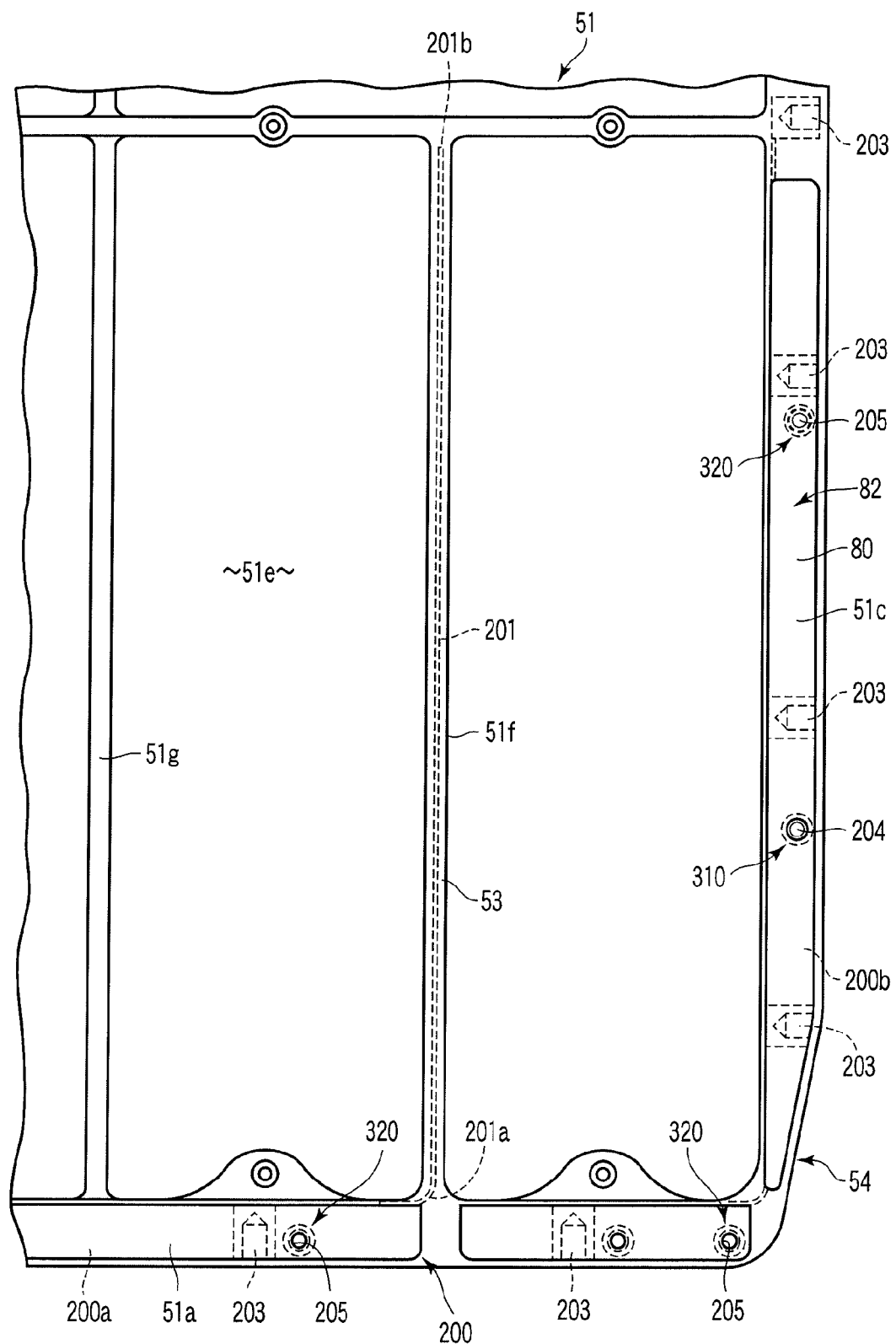
F I G. 7

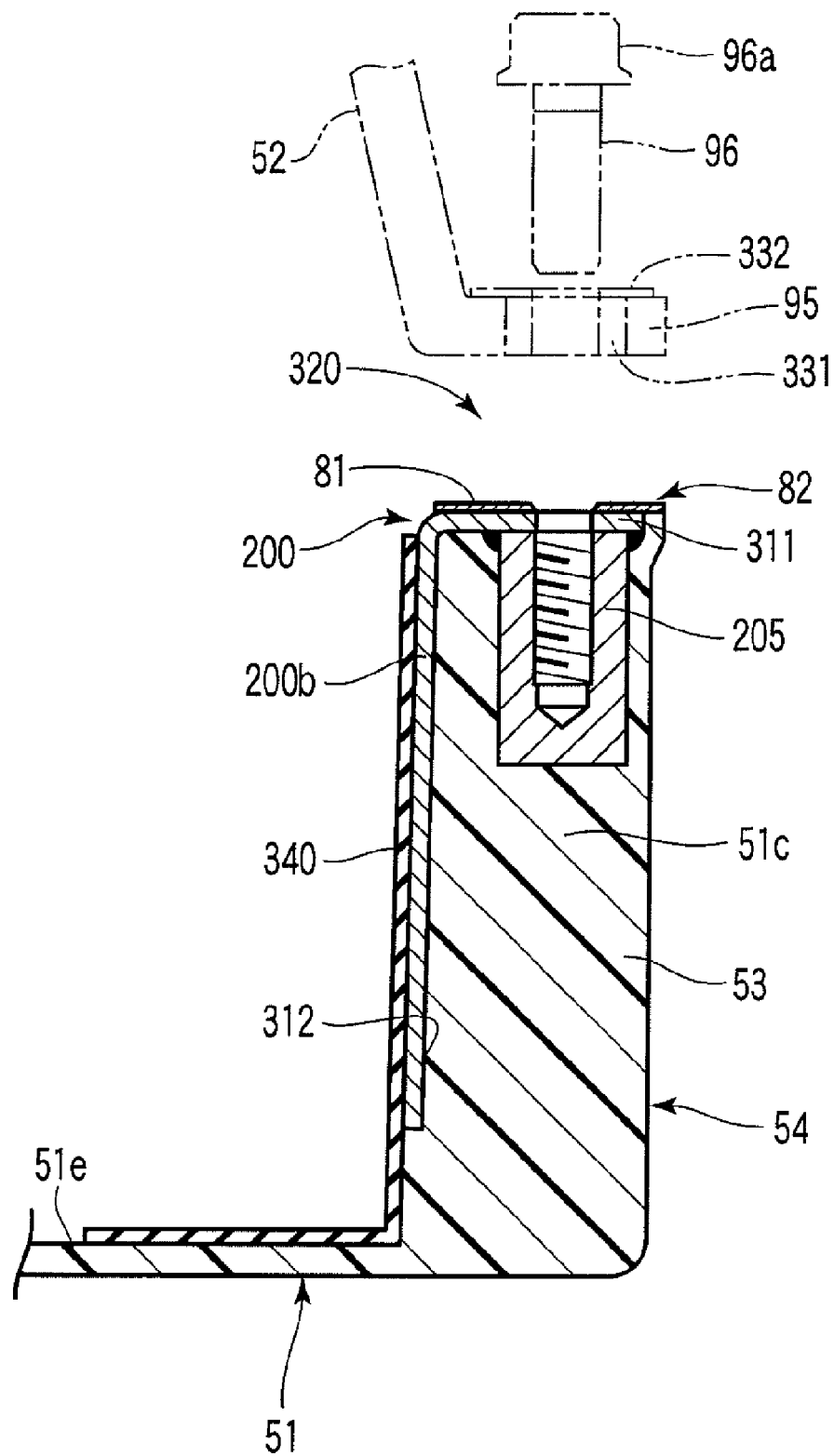
F I G. 11

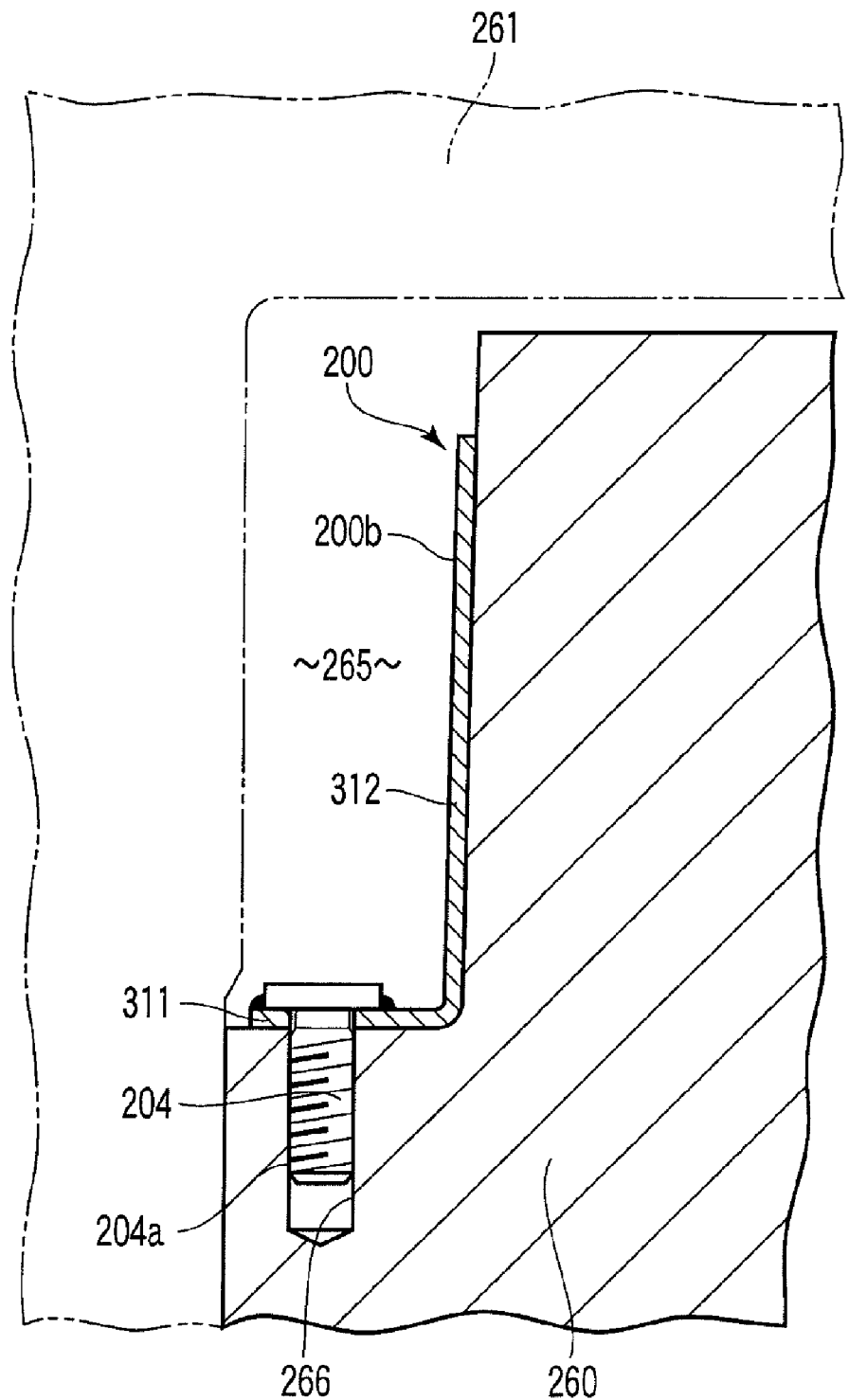
F I G. 12

BATTERY CASE FOR ELECTRIC VEHICLE

CROSS-REFERENCE TO RELATED APPLICATIONS

This is a Continuation application of PCT Application No. PCT/JP2008/053996, filed Mar. 5, 2008, which was published under PCT Article 21(2) in Japanese.

This application is based upon and claims the benefit of priority from prior Japanese Patent Application No. 2007-254263, filed Sep. 28, 2007, the entire contents of which are incorporated herein by reference.

BACKGROUND OF THE INVENTION

1. Field of the Invention

The present invention relates to a battery case for containing battery modules of an electric vehicle which runs by means of a motor using a battery as a power source.

2. Description of the Related Art

A battery unit used for an electric vehicle includes battery modules and a battery case for containing the battery modules. An example of the battery case includes a tray member for supporting the battery modules, and a cover member for covering an upper part of the tray member.

In, for example, Jpn. Pat. Appln. KOKAI Publication No. 8-186390, a tray member and cover member are disclosed. A joint part between a peripheral edge part of the tray member and peripheral edge part of the cover member is fastened by a plurality of bolts and nuts. These bolts are inserted into bolt inserting holes formed in the peripheral edge part of the cover member from above the cover member. Further, these bolts are screwed into the nuts arranged on the underside of the peripheral edge part of the tray member.

In a battery unit requiring a high degree of waterproof property such as a lithium ion battery, the joint part between the peripheral edge part of the tray member and the peripheral edge part of the cover member is provided with a waterproof seal member. Water is prevented from entering inside from the joint part by the seal member. The seal member is, for example, a resin-based seal member having fluidity, and hardens after being applied to the joint part.

In the case where the nuts are embedded in the tray member, when the liquid seal member is applied to the joint part of the tray member, part of the seal member enters the threaded part of the nut of the tray member in some cases. When the seal member enters the threaded part and hardens, there is the possibility of the tightening torque of the bolt screwed into the nut becoming unstable. In the battery case requiring a high degree of waterproof property, it is necessary to carry out torque control of bolts for fastening the tray member and cover member to each other. However, if the seal member enters the threaded part of the nut as described above, the tightening torque of the bolt is affected by the seal member, and thus accurate torque control cannot be expected.

It has been conceivable, in order to prevent the seal member from entering the threaded parts of the nuts, that embedded bolts are provided on the tray member side, and the nuts are screwed onto the bolts from above the cover member. However, in order to provide the tray member with a plurality of embedded bolts, it is necessary to attach a plurality of embedded bolts to an insert member at predetermined positions by welding or the like. Further, it is necessary to form holes into which the embedded bolts are to be inserted inside a mold die for molding the tray member.

There is naturally a limit to manufacturing an insert member of sheet metal with a high degree of accuracy. Thus, when a plurality of embedded bolts are fixed to one insert member, relative positions of the embedded bolts are somewhat deviated from ideal positions in whatever way in some cases. In the die for molding the tray member, a plurality of holes into which the plurality of embedded bolts are to be inserted are formed. Thus, if the positions of the embedded bolts are deviated even a little, it becomes difficult to insert the embedded bolts into the holes formed at predetermined positions of the die.

SUMMARY OF THE INVENTION

The present invention provides a battery case that makes it possible to prevent a seal member to be provided at a joint part between a tray member and a cover member from adversely affecting the torque control of the threaded part, and makes it easy to set an insert member in a die for molding the tray member.

The present invention is a battery case for an electric vehicle for containing therein battery modules and comprises a tray member for supporting the battery modules, and a cover member to be put on top of the tray member, and fixed to the tray member. The tray member includes a resin section constituted of a peripheral wall and bottom wall formed of a resin, an insert structure including at least one insert member embedded in the peripheral wall, and a seal member applied to a joint part between the tray member and cover member. Further, the insert member includes an embedded bolt arranged in the peripheral wall in such a manner that a threaded part thereof protrudes from the joint part of the tray member, and embedded nuts arranged in the peripheral wall at positions different from the embedded bolt. The battery case further comprises first fastening sections each of which is formed by screwing a nut member onto the embedded bolt, and fastening the nut member in a state where the cover member is put on top of the tray member, and second fastening sections each of which is formed by screwing a bolt member into the embedded nut, and fastening the bolt member in the state where the cover member is put on top of the tray member.

That is, the first fastening section is constituted of the embedded bolt, and the nut member thread-engaged with the embedded bolt. The second fastening section is constituted of the embedded nut and the bolt member thread-engaged with the embedded nut.

According to the present invention, it is possible to prevent the seal member applied to the joint part between the tray member and cover member from adhering to the threaded part of the embedded bolt. Accordingly, it is possible to accurately carry out torque control of the nut member with respect to the threaded part of the embedded bolt. Further, it is possible to fix the peripheral edge part of the cover member to the tray member by means of the embedded bolt, nut member, embedded nut, and bolt member.

In one aspect of the present invention, the seal member to be applied to the joint part between the tray member and cover member is applied to a peripheral edge part of the joint part. According to this aspect, it is possible to prevent the seal member from adhering to the embedded bolt and embedded nut provided in the tray member. As a result of this, it is possible to accurately carry out torque control of the nut member to be thread-engaged with the embedded bolt, and torque control of the bolt member to be thread-engaged with embedded nut.

In another aspect of the present invention, a first collar made of metal is arranged in a hole of a peripheral edge part of the cover member into which the embedded bolt is inserted, the first collar is interposed between the insert member and the nut member, a second collar is arranged in a hole of the peripheral edge part of the cover member into which the bolt member is inserted, and the second collar is interposed between the insert member and a head section of the bolt member. By being provided with such collars, even when the resin section fastened by the embedded bolt and nut member, and the resin section fastened by the embedded nut and bolt member deteriorate with time, the fastening torque of the bolt member or nut member never lowers.

The battery case for an electric vehicle according to a preferred aspect of the present invention, further comprises beam members arranged on the undersurface side of the tray member, and extending in the width direction of the vehicle body, embedded horizontal nuts fixed to the insert members, and extending in the horizontal direction, and bolts to be screwed into the embedded horizontal nuts, for fixing the tray member to the beam members, wherein both end parts of the beam members are fixed to a pair of side members of the vehicle body from the undersurface side of the vehicle body by means of bolts.

In another preferred aspect of the present invention, each of the insert members is provided with only one embedded bolt. According to this aspect, a hole (hole into which the embedded bolt is to be inserted) to be provided in the die for molding the tray member has only to be provided at only one position for each of the insert members. As a result of this, when the insert members are set in the die, it is easily possible to insert the embedded bolts into the holes of the die. Further, it is possible to insert the embedded bolts into the holes of the die even when the positions of the embedded bolts fixed to the insert members somewhat vary.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 1 is a perspective view of an electric vehicle including a battery case according to an embodiment of the present invention.

FIG. 3 is a perspective view of a tray member, cover member, and beam members of the battery unit shown in FIG. 2.

FIG. 6 is a perspective view showing insert members, and the like to be embedded in the tray member shown in FIG. 3.

FIG. 7 is a plan view showing part of the tray member shown in FIG. 3.

FIG. 11 is a cross-sectional view of a part of the tray member shown in FIG. 3 provided with an embedded nut.

FIG. 12 is a cross-sectional view showing part of a die for molding the tray member shown in FIG. 3, and an insert member.

DETAILED DESCRIPTION OF THE INVENTION

Figure 2:
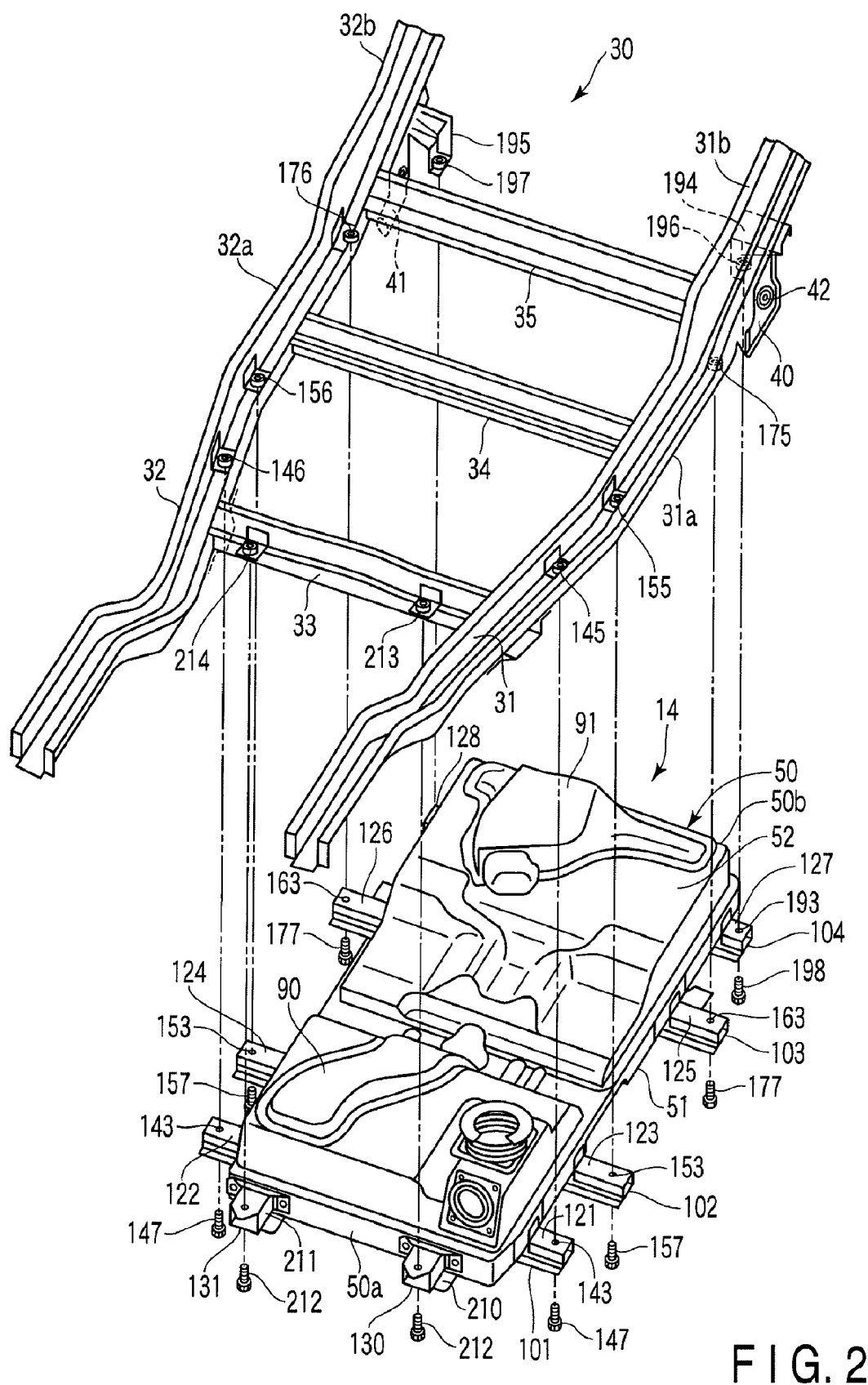
FIG. 2 is a perspective view of the frame structure and battery unit of the electric vehicle shown in FIG. 1.

An embodiment of the present invention will be described below with reference to FIGS. 1 to 12.

FIG. 1 shows an example of an electric vehicle 10. This electric vehicle 10 is provided with a motor 12 for traveling, and charging equipment 13 which are arranged at the rear part of the vehicle body 11, a battery unit 14 arranged under the floor of the vehicle body 11, and the like. A heat exchanger unit 15 for air-conditioning is arranged at the front part of the vehicle body 11.

The front wheels 20 of the vehicle 10 are supported by the vehicle body 11 by means of front suspensions (not shown). The rear wheels 21 are supported by the vehicle body 11 by means of rear suspensions (not shown). An example of the rear suspension is a trailing arm type rear suspension.

FIG. 2 shows a frame structure 30 constituting a lower skeletal structure of the vehicle body 11, and the battery unit 14 to be attached to the frame structure 30.

The frame structure 30 includes a pair of right and left side members 31 and 32 extending in the back-and-forth direction of the vehicle body 11, and cross members 33, 34, and 35 extending in the width direction of the vehicle body 11. The cross members 33, 34, and 35 are fixed to predetermined positions of the side members 31 and 32 by welding.

Suspension arm support brackets 40 and 41 are provided at the rear parts of the side members 31 and 32. Each of the suspension arm support brackets 40 and 41 is fixed to a predetermined position of each of the side members 31 and 32 by welding. Each of the suspension arm support brackets 40 and 41 is provided with an axis section 42. Front end parts of the trailing arms are attached to these axis sections 42.

As shown in FIG. 3, the battery unit 14 is provided with a battery case 50. The battery case 50 includes a tray member 51 positioned on the lower side, and a cover member 52 positioned on the upper side.

The tray member 51 is constituted of a resin section 53 integrally formed of a resin having electrical insulating properties, and insert structure 200 (shown in FIGS. 6 and 7) to be described later. The resin which is a material of the resin section 53 is a resin obtained by reinforcing a base material constituted of, for example, polypropylene with short glass fibers having a length of about several mm to several cm.

The tray member 51 includes a front wall 51a, rear wall 51b, a pair of right and left side walls 51c and 51d, bottom wall 51e, and partition walls 51f and 51g. The tray member 51 is formed into a box-like shape opened at its top surface. The front wall 51a is positioned on the front side with respect to the back-and-forth direction of the vehicle body 11. The rear wall 51b is positioned on the rear side. The partition walls 51f and 51g extend in the back-and-forth direction. The peripheral wall 54 of the tray member 51 is constituted of the front wall 51a, rear wall 51b, and both side walls 51c and 51d. This tray member 51 is formed by stamping forming to be described later. An insert structure 200 is embedded in the resin section 53 at a predetermined position.

A front battery containing section 55 is formed at the front half part of the battery case 50. A rear battery containing section 56 is formed at the rear half part of the battery case 50.

A center battery containing section 57, an electric circuit containing section 58, and the like are formed between the front battery containing section 55 and rear battery containing section 56.

A battery module 60 (only part thereof is shown by two-dot chain lines in FIG. 3) is contained in each of the battery containing sections 55, 56, and 57. The battery module 60 is supported by the bottom wall 51e of the tray member 51. An example of the battery module 60 is formed by connecting, in series, a plurality of cells each of which is constituted of a lithium ion battery.

Electric components 61 (part of them are schematically shown in FIGS. 3 and 6) and the like are contained in the electric circuit containing section 58. The electric components 61 have a function of managing a monitor for detecting a state of the battery module 60, and control and the like. The electric components 61 are electrically connected to the battery modules 60.

Figure 4:
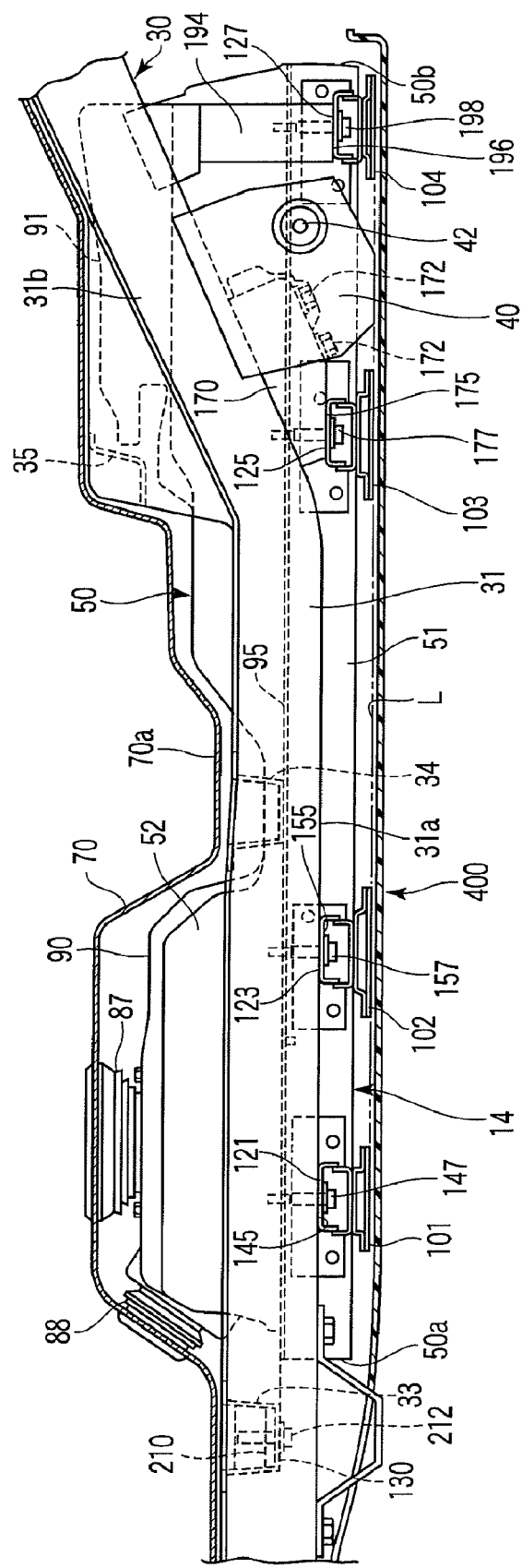
FIG. 4 is a side view of the frame structure and battery unit of the electric vehicle shown in FIG. 1.

As shown in FIG. 4, the battery unit 14 is arranged on the undersurface side of a floor panel 70. The floor panel 70 extends in the back-and-forth direction and width direction of the vehicle body 11. The floor part of the vehicle body 11 is constituted of the floor panel 70. The floor panel 70 is fixed to predetermined positions of the frame structure 30 including the side members 31 and 32 by welding.

Front seats 71 (shown in FIG. 1) and rear seats 72 are arranged above the floor panel 70. The front battery containing section 55 of the battery unit 14 is arranged below the front seats 71. The rear battery containing section 56 of the battery unit 14 is arranged below the rear seats 72. The floor panel 70 includes a concave portion 70a. The concave portion 70a of the floor panel 70 is formed between the front battery containing section 55 and rear battery containing section 56. This concave portion 70a is positioned in the vicinity of the feet of the occupants seated on the rear seats 72.

A cover fitting surface 80 (shown in FIGS. 3 and 7) is formed at a peripheral edge part of the tray member 51. The cover fitting surface 80 is continuous over the whole circumference of the tray member 51. A waterproof seal member 81 is provided at a peripheral edge part of a joint part 82 between the tray member 51 and cover member 52. This seal member 81 is a resin-based liquid seal member, and hardens after being applied to the cover fitting surface 80. The seal member 81 is applied to only the peripheral edge part of the joint part 82, and hence it is possible to prevent the seal member 81 from adhering to the embedded bolt 204 and embedded nut 205 to be described later.

As shown in FIG. 6, the insert structure 200 includes three insert members 200a, 200b, and 200c arranged at the front half part of the tray member 51, and three insert members 200d, 200e, and 200f arranged at the rear half part of the tray member 51. These insert members 200a to 200f are sheet metal (for example, steel sheet) stampings.

The insert members 200a, 200b, and 200c on the front side are embedded in the front wall 51a, and both the side walls 51c and 51d of the tray member 51, respectively. The front wall 51a, and both the side walls 51c and 51d of the tray member 51 are reinforced by these insert members 200a, 200b, and 200c. The rear wall 51b and both the side walls 51c and 51d of the tray member 51 are reinforced by the insert members 200d, 200e, and 200f embedded in the rear half part of the tray member 51.

A pair of right and left reinforcement plates 201 is provided at both ends of the insert member 200a positioned at the front-center of the tray member 51. The reinforcement plates 201 are embedded in the partition walls 51f of the tray member 51. As shown in FIG. 7, the front end 201a of the reinforcement plate 201 is attached to the insert member 200a. The rear end 201b of the reinforcement plate 201 extends toward the rear side of the vehicle body 11.

In order to enhance the anchorage strength of the reinforcement plate with respect to the resin section 53, a plurality of holes 202 are formed in the reinforcement plate 201. The holes 202 penetrate the reinforcement plate 201 in the thickness direction. Part of the resin of the resin section 53 enters the holes 202, and hardens. As a result of this, it is possible to enhance the anchorage strength of the reinforcement plate 201 with respect to the resin section 53.

The bottom wall 51e, partition walls 51f and 51g, and peripheral wall 54 of the tray member 51 are integrally formed by pressurizing the material of the resin section 53 by using the die (lower die 260 and upper die 261) schematically shown in FIG. 12. A cavity 265 is formed between the lower die 260 and upper die 261. The insert structure 200 is set inside the cavity 265 along the lower die 260. A plurality of holes 266 are formed in the lower die 260. Threaded parts 204a of the embedded bolts 204 to be described later are inserted into the holes 266.

As shown in FIG. 6, each of the insert members 200a to 200f is provided with embedded horizontal nuts 203 extending in the horizontal direction, an embedded bolt 204 protruding upward, and embedded nuts 205 in the vertical direction. A first fastening section 310 (shown in FIGS. 7 to 10) is constituted of the embedded bolt 204, and a nut member 97.

The embedded bolt 204 is fixed to an upper wall 311 of the insert structure 200 in such a manner that the threaded part 204a thereof protrude upward from the cover fitting surface 80. The cover fitting surface 80 is formed at the joint part 82 between the tray member 51 and cover member 52, and extends in the horizontal direction.

A second fastening section 320 (shown in FIGS. 7, 8, and 11) is constituted of the embedded nut 205 and a bolt member 96. The embedded nut 205 is fixed in the upper wall 311 of the insert structure 200 in a state where the nut 205 is embedded inside with respect to the joint part 82 of the tray member 51. The embedded bolt 204 and embedded nut 205 described above are each provided on the insert members 200a to 200f. Furthermore, the embedded bolt 204 and embedded nut 205 are provided at positions separate from each other in the horizontal direction.

The cover member 52 is constituted of an integrally molded product of a synthetic resin reinforced by fibers. An opening 85 for service plug and cooling air introduction opening 86 are formed at a front part of the cover member 52. A bellows-like boot 87 is attached to the opening 85 for service plug. A bellows-like boot 88 is also attached to the cooling air introduction opening 86. A bypass flow path 90 for causing part of the cooling air to flow therethrough, cooling fan containing section 91, and the like are provided on the top surface of the cover member 52.

Figure 9:
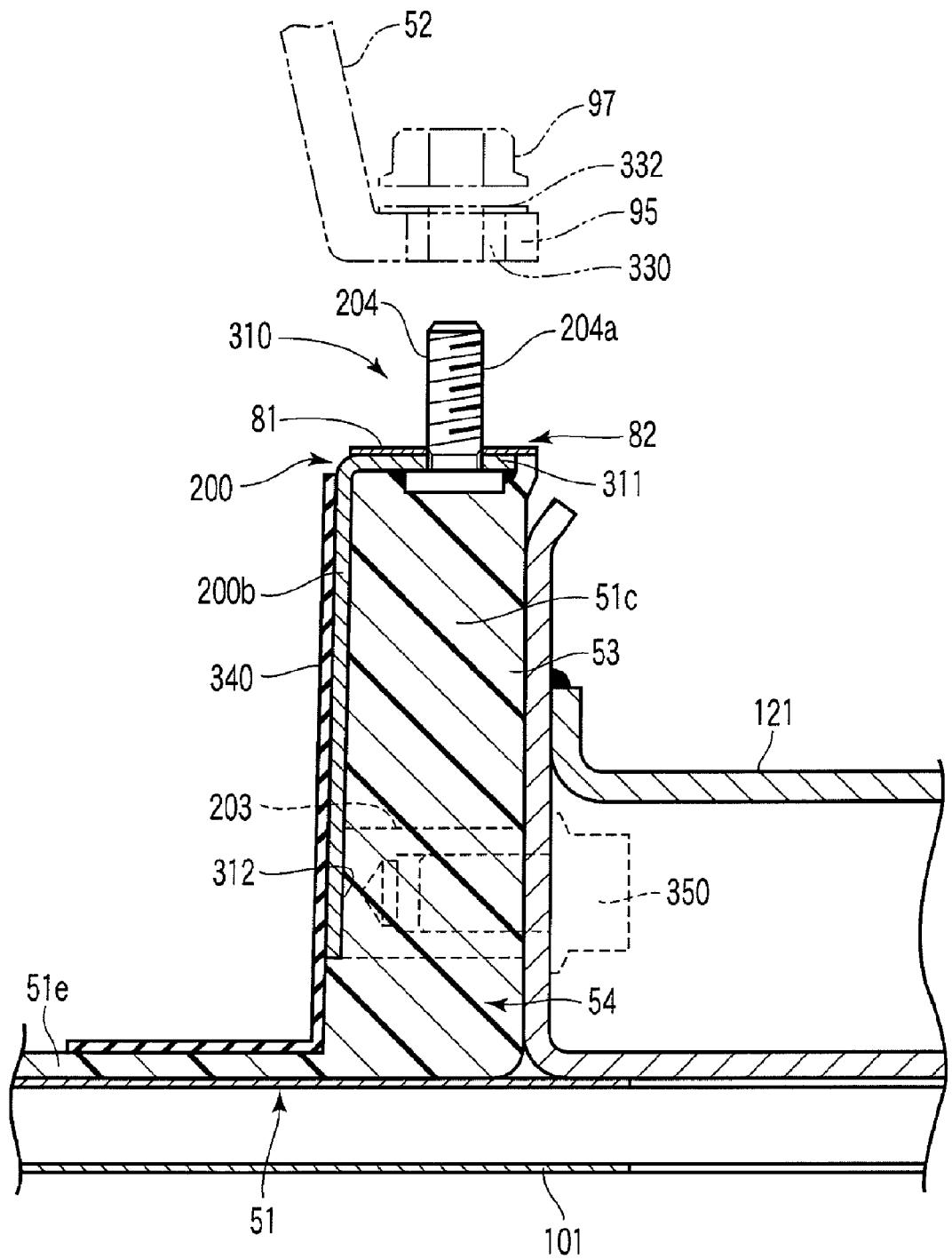
FIG. 9 is a cross-sectional view of part of the tray member and beam member taken along line F9-F9 in FIG. 8.
Figure 10:
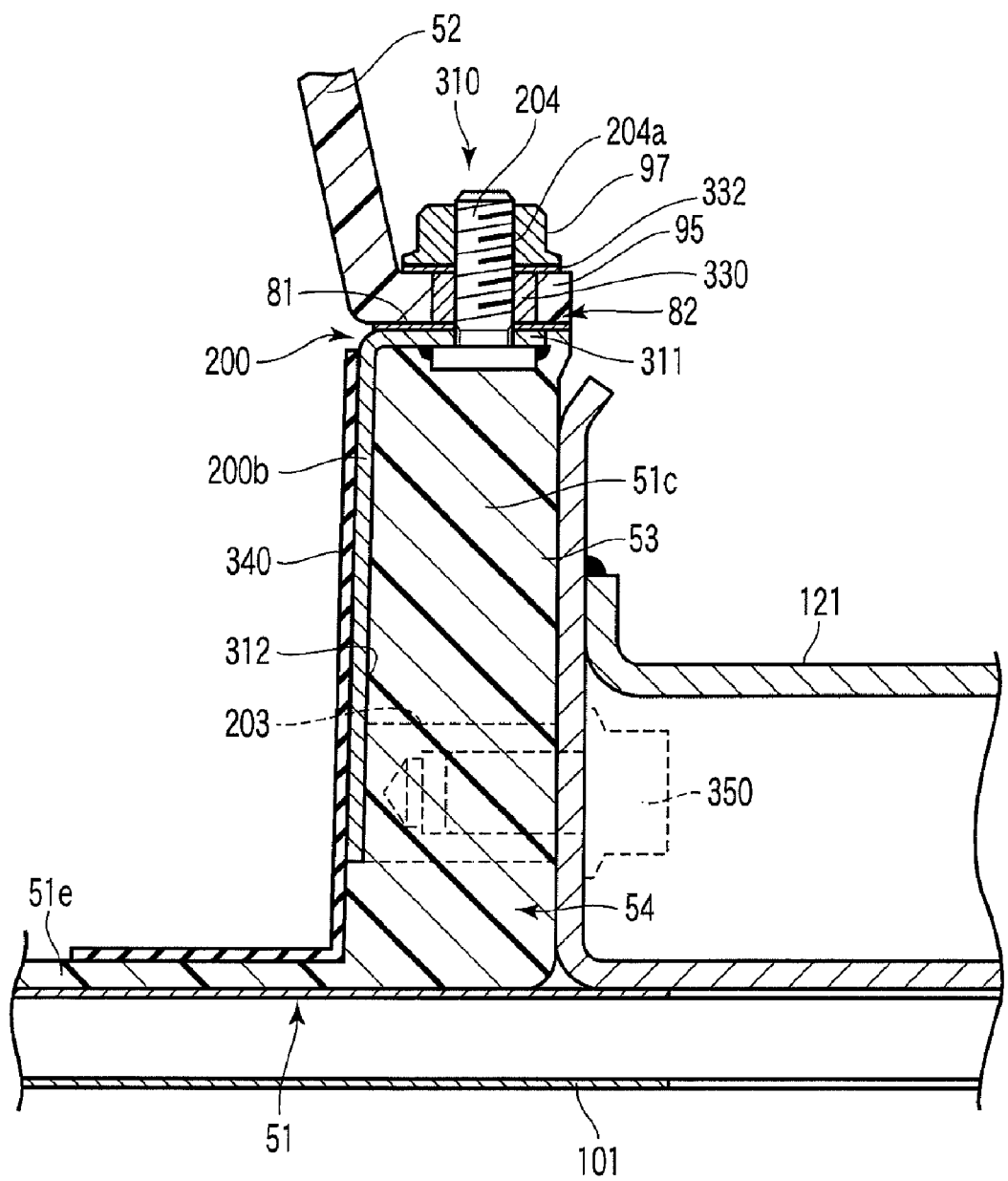
FIG. 10 is a cross-sectional view of a state where a nut member is screwed onto the embedded bolt shown in FIG. 9.

A flange portion 95 is formed at a peripheral edge part of the cover member 52. The flange portion 95 is continuous over the whole circumference of the cover member 52. As shown in FIGS. 9 and 10, in the flange portion 95, a first collar 330 made of metal is fitted in a hole into which the embedded bolt 204 is inserted. The collar 330 is interposed between the upper wall 311 of the insert structure 200 and the nut member 97 when the nut member 97 is screwed onto the embedded bolt 204. A washer 332 made of sheet metal is arranged on the top surface of the flange portion 95.

As shown in FIG. 11, in the flange portion 95, a second collar 331 made of metal is fitted in a hole into which the bolt member 96 is inserted. The collar 331 is interposed between the upper wall 311 of the insert structure 200 and a head section 96a of the bolt member 96 when the bolt member 96 is screwed into the embedded nut 205. The tray member 51 and cover member 52 are fastened to each other through the collars 330 and 331 made of metal. As a result of this, even when the resin section of the fastening section deteriorates with time, the fastening torque never lowers.

When the tray member 51 and cover member 52 are fastened to each other, the seal member 81 is applied to the cover fitting surface 80 of the tray member 51. That is, the liquid seal member 81 is applied to the peripheral edge part of the joint part 82 between the tray member 51 and cover member 52. The threaded part 204a (shown in FIG. 9) of the embedded bolt 204 protrudes upward from the cover fitting surface 80. Thus, it is possible to prevent the seal member 81 from adhering to the threaded part 204a. After the seal member 81 has hardened to a certain degree, the cover member 52 is placed on the tray member 51. After that, the flange portion 95 of the cover member 52 is put on top of the cover fitting surface 80 of the tray member 51.

At the first fastening section 310, the nut member 97 is screwed onto the embedded bolt 204 from above the cover member 52. The nut member 97 is fastened at predetermined torque. No seal member 81 adheres to the threaded part 204a of the embedded bolt 204, and hence it is possible to accurately carry out the fastening torque control of the nut member 97. On the other hand, at the second fastening section 320, the bolt member 96 is screwed into the embedded nut 205 from above the cover member 52, and is fastened. In this way, the tray member 51 and cover member 52 are fastened to each other through the seal member 81 in a watertight manner.

As shown in FIGS. 9 to 11, an insulating member 340 having electrical insulating properties is provided on the inner surface side of the tray member 51 at a part at which the insert structure 200 is exposed. An example of the insulating member 340 is an insulating tape. It should be noted that the entire insert structure 200 may be embedded in the resin section 53 having the electrical insulating properties. In this case, the insulating member 340 can be omitted.

Figure 5:
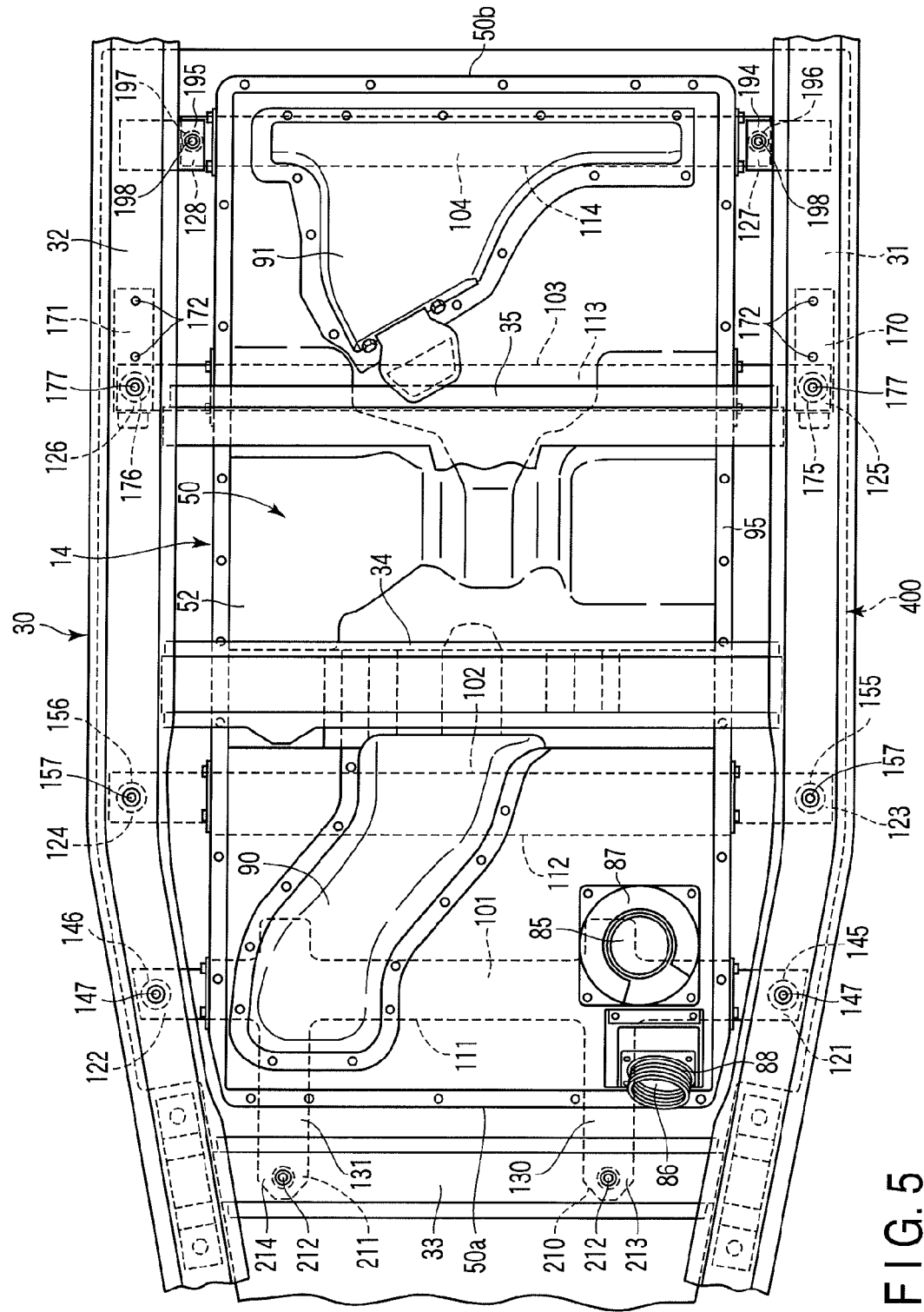
FIG. 5 is a plan view of the frame structure and battery unit of the electric vehicle shown in FIG. 1 viewed from above.

A plurality of (for example, four) beam members 101, 102, 103, and 104 are provided on the undersurface side of the tray member 51. As shown in FIGS. 3 and 5, the beam members 101, 102, 103, and 104 respectively include beam bodies 111, 112, 113, and 114 extending in the width direction of the vehicle body 11. The beam members 101, 102, 103, and 104 are constituted of a metallic material (for example a steel sheet). These beam members are each provided with strength sufficient to support the weight of the battery unit 14.

The first beam body 111 from the front is provided with joining portions 121 and 122 at both ends thereof. The second beam body 112 from the front is provided with joining portions 123 and 124 at both ends thereof. The third beam body 113 from the front is provided with joining portions 125 and 126 at both ends thereof. The fourth (rearmost) beam body 114 from the front is provided with joining portions 127 and 128 at both ends thereof. A pair of right and left front support members 130 and 131 is provided at a front end part of the battery unit 14.

A bolt inserting hole 143 (shown in FIGS. 2 and 3) is formed in each of the joining portions 121 and 122 provided at both the ends of the first beam member 101 from the front. The bolt inserting hole 143 penetrates the joining portion 121 or 122 in the vertical direction. The side members 31 and 32 are provided with battery unit fitting portions 145 and 146 at positions opposed to the joining portions 121 and 122. The battery unit fitting portions 145 and 146 are provided with nut members. A bolt 147 (shown in FIGS. 2 and 4) is inserted into the bolt inserting hole 143 from below the joining portion 121 or 122. The bolt 147 is screwed into the nut member of the battery unit fitting portion 145 or 146 to be fastened. As a result of this, the joining portions 121 and 122 of the first beam member 101 are fixed to the side members 31 and 32.

Figure 8:
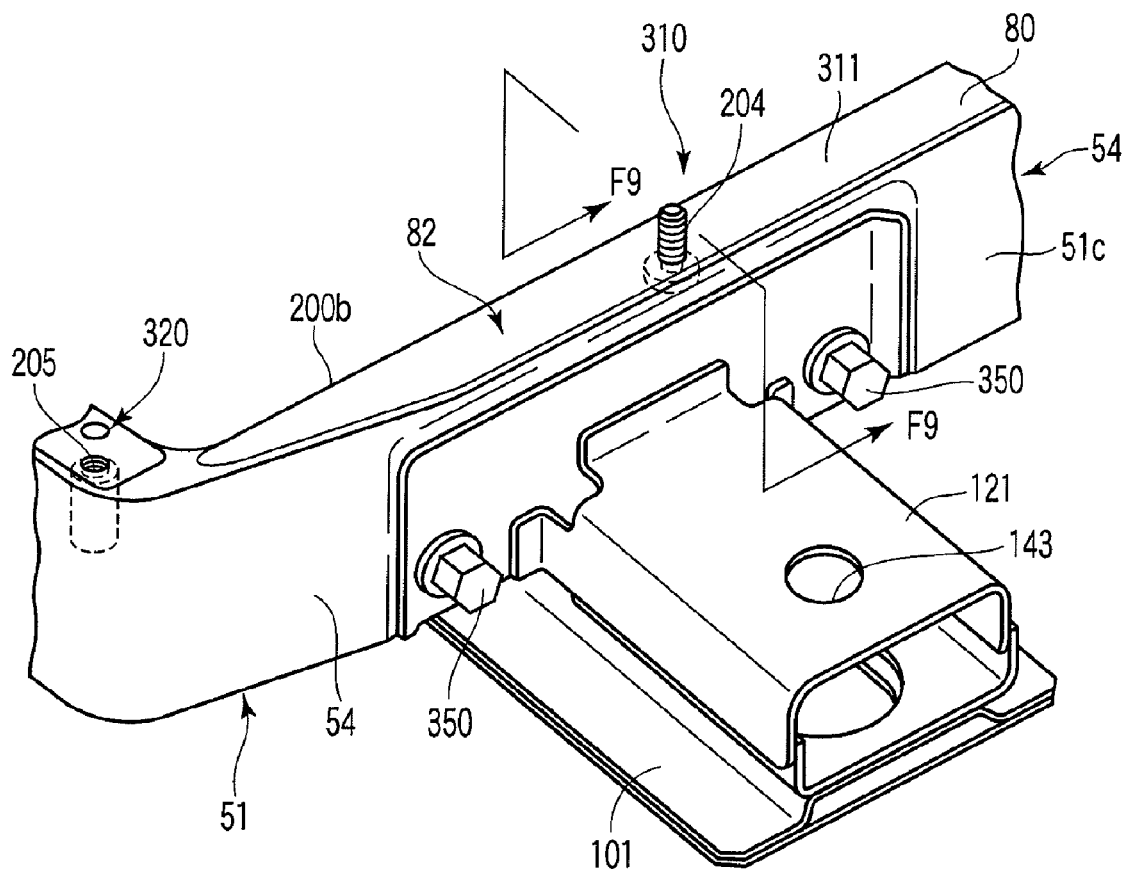
FIG. 8 is a perspective view showing part of the tray member and part of the beam member shown in FIG. 3 in an enlarging manner.

In FIGS. 8 to 10, the joining portion 121 of the beam member 101 is shown. Bolts 350 extending in the horizontal direction are screwed into the embedded horizontal nuts 203, whereby the beam member 101 is fixed to the tray member 51. The embedded horizontal nut 203 is fixed to a vertical wall 312 of the insert structure 200. As described previously, the embedded bolt 204 is fixed to the upper wall 311 of the insert structure 200. The cover member 52 is fixed to the tray member 51 through the collar 330 made of metal and washer 332. The joining portion 121 of the beam member 101 is fixed to the side member 31 by means of the bolt 147.

That is, the tray member 51 and cover member 52 are fixed to the side member 31 through the collars 330 and 331 made of metal, bolt member 96 and nut member 97 made of metal, insert structure 200 made of metal, embedded nut 203 and embedded bolt 204 made of metal, and beam member 101 made of metal. Accordingly, the anchorage strength of the battery case 50 is high with respect to the vehicle body 11, and the cover member 52 hardly loosens during the running of the vehicle. Further, it is possible to maintain the waterproofness of the battery case 50. The same is true of the joining portions 122 to 128 other than the joining portion 121.

A bolt inserting hole 153 (shown in FIGS. 2 and 3) is formed in each of the joining portions 123 and 124 provided at both the ends of the second beam member 102 from the front. The bolt inserting hole 153 penetrates the joining portion 123 or 124 in the vertical direction. The side members 31 and 32 are provided with battery unit fitting portions 155 and 156 at positions opposed to the joining portions 123 and 124. The battery unit fitting portions 155 and 156 are provided with nut members. A bolt 157 (shown in FIGS. 2 and 4) is inserted into the bolt inserting hole 153 from below the joining portion 123 or 124. The bolt 157 is screwed into the nut member of the battery unit fitting portion 155 or 156 to be fastened. As a result of this, the joining portions 123 and 124 of the second beam member 102 are fixed to the side members 31 and 32.

A bolt inserting hole 163 (shown in FIGS. 2 and 3) is formed in each of the joining portions 125 and 126 provided at both the ends of the third beam member 103 from the front. The bolt inserting hole 163 penetrates the joining portion 125 or 126 in the vertical direction. As shown in FIGS. 4 and 5, load transmission members 170 and 171 are fixed to the side members 31 and 32 by means of bolts 172. The load transmission members 170 and 171 are provided above the joining portions 125 and 126 of the third beam member 103 from the front. The one load transmission member 170 is welded to one suspension arm support bracket 40. The other load transmission member 171 is welded to the other suspension arm support bracket 41.

That is, the load transmission members 170 and 171 are joined to the side members 31 and 32, and suspension arm support brackets 40 and 41. These load transmission members 170 and 171 constitute part of the frame structure 30. The load transmission members 170 and 171 are provided with battery unit fitting portions 175 and 176 including nut members.

A bolt 177 is inserted into the bolt inserting hole 163 from below the joining portion 125 or 126. The bolt 177 is screwed into the nut member of the battery unit fitting portion 175 or 176 to be fastened. As a result of this, the joining portions 125 and 126 of the third beam member 103 are fixed to the side members 31 and 32 through the load transmission members 170 and 171.

A bolt inserting hole 193 (shown in FIGS. 2 and 3) is formed in each of the joining portions 127 and 128 of the fourth beam member 104 from the front. The bolt inserting hole 153 penetrates the joining portion 127 or 128 in the vertical direction. The side members 31 and 32 are provided with extension brackets 194 and 195 at positions opposed to the joining portions 127 and 128. The extension brackets 194 and 195 extend to positions beneath kick-up frame portions 31*b* and 32*b* of the side members 31 and 32. The extension brackets 194 and 195 constitute part of the frame structure 30. These extension brackets 194 and 195 are provided with battery unit fitting portions 196 and 197 including nut members.

A bolt 198 (shown in FIGS. 2 and 4) is inserted into the bolt inserting hole 193 from below the joining portion 127 or 128. The bolt 198 is screwed into the nut member of the battery unit fitting portion 196 or 197 to be fastened. As a result of this, the joining portions 127 and 128 of the fourth beam member 104 are fixed to the side members 31 and 32 through the extension brackets 194 and 195.

As shown in FIG. 4, undersurfaces of the beam members 101, 102, 103, and 104 are positioned on the same plane L extending in the horizontal direction along the flat undersurface of the tray member 51. The first and second beam members 101 and 102 are directly fixed to the battery unit fitting portions 145, 146, 155, and 156 provided at the horizontal portions 31*a* and 32*a* of the side members 31 and 32.

The third and fourth beam members 103 and 104 are fixed to the battery unit fitting portions 175, 176, 196, and 197 provided beneath the kick-up frame portions 31*b* and 32*b* of the side members 31 and 32. That is, the third and fourth beam members 103 and 104 are located at positions downwardly offset from the kick-up frame portions 31*b* and 32*b*. Accordingly, the third beam member 103 is fixed to the battery unit fitting portions 175 and 176 through the load transmission members 170 and 171 each of which has a certain thickness in the vertical direction. The fourth beam member 104 is fixed to the battery unit fitting portions 196 and 197 by means of the extension brackets 194 and 195 extending to the positions beneath the kick-up frame portions 31*b* and 32*b*.

The front support members 130 and 131 which are located at the front end of the battery unit 14 protrude forward from the first beam member 101 from the front. The front support members 130 and 131 are joined to the beam member 101. As shown in FIG. 2, joining portions 210 and 211 provided to the front support members 130 and 131 are fixed to the battery unit fitting portions 213 and 214 of the cross member 33 by means of bolts 212.

As described above, the beam members 101, 102, 103, and 104 of the electric vehicle of this embodiment are provided between the right and left side members 31 and 32. The side members 31 and 32 are joined to each other by the beam members 101, 102, 103, and 104. Thus, the beam members 101, 102, 103, and 104 of the battery unit 14 can function as rigid members corresponding to the cross members.

Further, the load transmission members 170 and 171 are fixed to the suspension arm support brackets 40 and 41. The load in the transverse direction input to the suspension arm support brackets 40 and 41 is input to the beam member 103 through the load transmission members 170 and 171.

It is possible to enhance the rigidity of the parts around the suspension arm support brackets 40 and 41 by the beam member 103 even when a cross member is not arranged near the suspension arm support brackets 40 and 41. Accordingly, the steering stability and ride quality of the electric vehicle 10 are improved. In other words, it is possible to arrange part of the large-sized battery unit 14 in a space between the pair of right and left suspension arm support brackets 40 and 41. As a result of this, it becomes possible to mount the large-sized battery unit 14 on the electric vehicle, and prolong the travel distance of the electric vehicle.

As shown in FIGS. 1, 4, and 5, an under cover 400 is arranged under the battery unit 14. A top surface of the under cover 400 is opposed to the undersurfaces of the beam members 101, 102, 103, and 104. An example of a material of the under cover 400 is a synthetic resin reinforced with glass fibers. The under cover 400 is fixed to at least part of the frame structure 30 and beam members 101, 102, 103, and 104 from below the vehicle body 11 by means of bolts (not shown).

An overall length of the under cover 400 is larger than that of the battery unit 14. That is, the under cover 400 has a length sufficient to cover from the front end 50*a* to the rear end 50*b* of the battery case 50. A width of the under cover 400 is larger than that of the battery unit 14.

As described previously, the battery case 50 of this embodiment includes the tray member 51 for supporting the battery modules 60, cover member 52 put on top of the tray member 51, and seal member 81 provided to the joint part 82 between the tray member 51 and cover member 52. The tray member 51 includes the resin section 53, and the plurality of insert members 200*a* to 200*f* embedded in the resin section 53.

Further, each of the insert members 200*a* to 200*f* is provided with the embedded bolt 204 shown in FIG. 9, and embedded nut 205 shown in FIG. 11. The threaded part 204*a* of the embedded bolt 204 protrudes from the top surface of the joint part 82 of the tray member 51. The embedded nut 205 is embedded in the joint part 82 of the tray member 51 at a position different from the embedded bolt 204.

The battery case 50 of this embodiment includes the first fastening section 310 (shown in FIGS. 9 and 10), and second fastening section 320 (shown in FIG. 11). At the first fastening section 310, the nut member 97 is screwed onto the embedded bolt 204 from above the cover member 52, and is fastened in a state where the cover member 52 is put on top of the tray member 51. At the second fastening section 320, the bolt member 96 is screwed into the embedded nut 205 from above the cover member 52, and is fastened.

According to the battery case 50 configured as described above, it is possible to prevent the liquid seal member 81 applied to the joint part 82 between the tray member 51 and cover member 52 from adhering to the threaded part 204*a* (shown in FIG. 9) of the embedded bolt 204. This makes it possible to accurately carry out the fastening torque control of the nut member 97 to be screwed onto the embedded bolt 204, and accurately carry out the control of the waterproofness of the joint part 82. Further, it is possible to securely fasten the entire circumference of the cover member 52 by the plurality of first fastening sections 310 and the plurality of second fastening sections 320.

Furthermore, the insert structure 200 includes the plurality of insert members 200*a* to 200*f* made of sheet metal, and each of the insert members 200*a* to 200*f* is provided with one embedded bolt 204 and a plurality of embedded nuts 205.

That is, each of the insert members 200*a* to 200*f* is provided with only one embedded bolt 204. Accordingly, the hole 266 to be provided in the lower die 260 (partly shown in FIG. 12) has only to be provided at only one position for each of the insert members 200*a* to 200*f*. The threaded part 204*a* of the embedded bolt 204 is inserted into this hole 266. As a result of this, it becomes easy to set the insert members 200a to 200f in the lower die 260, and the structure of the lower die 260 is simplified.

As shown in FIGS. 9 and 10, the flange portion 95 of the cover member 52 is provided with the first collars 330 made of metal. The flange portion 95 is prevented, by the collars 330, from being crushed in a state where the nut members 97 are fastened to the bolts 204. As a result of this, the predetermined fastening torque can be maintained. As shown in FIG. 11, the flange portion 95 of the cover member 52 is provided with the second collars 331 made of metal. The flange portion 95 is prevented, by the collars 331, from being crushed in a state where the bolt members 96 are fastened to the nuts 205. As a result of this, it is possible to prevent the waterproofness of the joint part 82 between the tray member 51 and cover member 52 from being lowered.

It should be noted that in the above embodiment, an electric vehicle in which a motor for running is mounted on the rear part of the vehicle body has been described. However, the present invention can also be applied to an electric vehicle in which a motor for running is mounted on the front part of the vehicle body. Further, as for the insert members to be embedded in the tray member, it is sufficient if at least one insert member is provided. Further, in carrying out the present invention, it goes without saying that the structures and arrangements of the constituent elements of the present invention such as the motor, tray member, cover member, insert member, embedded bolt, embedded nut, and the like can be appropriately modified and implemented.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A battery case for an electric vehicle for containing therein battery modules, comprising:
    a tray member for supporting the battery modules;
    a cover member to be put on top of the tray member, and fixed to the tray member,
    the tray member including a resin section constituted of a peripheral wall and bottom wall formed of a resin, an insert structure including at least one insert member embedded in the peripheral wall, and a seal member applied to a joint part between the tray member and cover member, and
    the insert member including an embedded bolt arranged in the peripheral wall in such a manner that a threaded part thereof protrudes from the joint part of the tray member, and embedded nuts arranged in the peripheral wall of the tray member at positions different from the embedded bolt;
    the battery case further comprising:
    first fastening sections each of which is formed by screwing a nut member onto the embedded bolt, and fastening the nut member in a state where the cover member is put on top of the tray member; and
    second fastening sections each of which is formed by screwing a bolt member into the embedded nut, and fastening the bolt member in the state where the cover member is put on top of the tray member, wherein
    a first collar made of metal is arranged in a hole of a peripheral edge part of the cover member into which the embedded bolt is inserted, the first collar is interposed between the insert member and the nut member, a second collar is arranged in a hole of the peripheral edge part of the cover member into which the bolt member is inserted, and the second collar is interposed between the insert member and a head section of the bolt member.

2. The battery case for an electric vehicle according to claim 1, wherein
    the seal member to be applied to the joint part between the tray member and cover member is applied to a peripheral edge part of the joint part.

3. The battery case for an electric vehicle according to claim 1, further comprising:
    beam members arranged on the undersurface side of the tray member, and extending in the width direction of the vehicle body;
    embedded horizontal nuts fixed to the insert members, and extending in the horizontal direction; and
    bolts to be screwed into the embedded horizontal nuts, for fixing the tray member to the beam members, wherein
    both end parts of the beam members are fixed to a pair of side members of the vehicle body from the undersurface side of the vehicle body by means of bolts.

4. The battery case for an electric vehicle according to claim 1, wherein
    each of the insert members is provided with only one embedded bolt.

5. The battery case for an electric vehicle according to claim 1, wherein
    the cover member has a flange portion formed around a peripheral edge part thereof that opposes the joint part of the tray member, and
    the seal member seals between the flange portion and the joint part.

6. The battery case for an electric vehicle according to claim 2, further comprising:
    beam members arranged on the undersurface side of the tray member, and extending in the width direction of the vehicle body;
    embedded horizontal nuts fixed to the insert members, and extending in the horizontal direction; and
    bolts to be screwed into the embedded horizontal nuts, for fixing the tray member to the beam members, wherein
    both end parts of the beam members are fixed to a pair of side members of the vehicle body from the undersurface side of the vehicle body by means of bolts.

7. The battery case for an electric vehicle according to claim 2, wherein
    each of the insert members is provided with only one embedded bolt.

8. The battery case for an electric vehicle according to claim 2, wherein
    the cover member has a flange portion formed around a peripheral edge part thereof that opposes the joint part of the tray member, and
    the seal member seals between the flange portion and the joint part.

* * * * *